(12) United States Patent
Srivastava et al.

(10) Patent No.: US 11,972,618 B2
(45) Date of Patent: *Apr. 30, 2024

(54) SYSTEM AND METHOD FOR IDENTIFYING ITEMS

(71) Applicant: Mashgin Inc., Palo Alto, CA (US)

(72) Inventors: Abhinai Srivastava, Palo Alto, CA (US); Mukul Dhankhar, Palo Alto, CA (US)

(73) Assignee: Mashgin Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/246,409

(22) Filed: Apr. 30, 2021

(65) Prior Publication Data

US 2021/0256724 A1 Aug. 19, 2021

Related U.S. Application Data

(63) Continuation of application No. 17/113,757, filed on Dec. 7, 2020, now Pat. No. 11,030,763.

(Continued)

(51) Int. Cl.
| | | |
|---|---|---|
| G06V 20/64 | (2022.01) | |
| G06N 3/04 | (2023.01) | |
| G06T 7/00 | (2017.01) | |
| G06T 7/38 | (2017.01) | |
| G06T 7/557 | (2017.01) | |

(Continued)

(52) U.S. Cl.
CPC .............. *G06V 20/64* (2022.01); *G06N 3/04* (2013.01); *G06T 7/38* (2017.01); *G06T 7/557* (2017.01); *G06T 7/593* (2017.01); *G06T 7/62* (2017.01); *G06T 7/97* (2017.01); *G06V 10/145* (2022.01); *G06V 10/764* (2022.01); *G06V 10/809* (2022.01); *G06V 10/82* (2022.01)

(58) Field of Classification Search
CPC .......... G06T 7/593; G06T 7/38; G06T 7/557; G06T 7/62; G06T 7/97; G06N 3/04
See application file for complete search history.

(56) References Cited

U.S. PATENT DOCUMENTS

| | | | | |
|---|---|---|---|---|
| 9,327,406 B1 * | 5/2016 | Hinterstoisser | ........ | B25J 9/1697 |
| 11,030,763 B1 * | 6/2021 | Srivastava | .............. | G06T 7/557 |

(Continued)

FOREIGN PATENT DOCUMENTS

| | | | | |
|---|---|---|---|---|
| CN | 107835997 A | * | 3/2018 | .......... G05D 1/0094 |
| CN | 112004645 A | * | 11/2020 | .......... A47L 11/4011 |

(Continued)

OTHER PUBLICATIONS

"Artificial Intelligence to disrupt retail" Checkout Technologies s.r.l.

(Continued)

*Primary Examiner* — Charles T Shedrick
(74) *Attorney, Agent, or Firm* — Jeffrey Schox; Diana Lin

(57) ABSTRACT

The method for item recognition can include: optionally calibrating a sampling system, determining visual data using the sampling system, determining a point cloud, determining region masks based on the point cloud, generating a surface reconstruction for each item, generating image segments for each item based on the surface reconstruction, and determining a class identifier for each item using the respective image segments.

21 Claims, 10 Drawing Sheets

Related U.S. Application Data

(60) Provisional application No. 62/945,032, filed on Dec. 6, 2019.

(51) Int. Cl.
    *G06T 7/593*     (2017.01)
    *G06T 7/62*     (2017.01)
    *G06V 10/145*     (2022.01)
    *G06V 10/764*     (2022.01)
    *G06V 10/80*     (2022.01)
    *G06V 10/82*     (2022.01)

(56) References Cited

U.S. PATENT DOCUMENTS

| | | | |
|---|---|---|---|
| 11,036,964 B2 | 6/2021 | Srivastava et al. | |
| 11,205,270 B1* | 12/2021 | Asmi | G06T 7/90 |
| 11,232,628 B1* | 1/2022 | Hillman | G06T 19/20 |
| 2005/0088529 A1 | 4/2005 | Geng | |
| 2009/0268967 A1 | 10/2009 | Simon et al. | |
| 2010/0111370 A1 | 5/2010 | Black et al. | |
| 2010/0217678 A1 | 8/2010 | Goncalves | |
| 2011/0182477 A1* | 7/2011 | Tamrakar | G06T 7/44 382/110 |
| 2012/0209741 A1 | 8/2012 | Bonner et al. | |
| 2013/0006787 A1 | 1/2013 | Iizaka et al. | |
| 2013/0223673 A1 | 8/2013 | Davis et al. | |
| 2013/0306727 A1 | 11/2013 | Shearin et al. | |
| 2014/0034731 A1 | 2/2014 | Gao et al. | |
| 2014/0079282 A1 | 3/2014 | Marcheselli et al. | |
| 2014/0177915 A1* | 6/2014 | Fan | G06T 7/593 382/103 |
| 2015/0023555 A1 | 1/2015 | Okamura et al. | |
| 2015/0178956 A1* | 6/2015 | Davis | G06T 11/001 345/582 |
| 2015/0253124 A1 | 9/2015 | Steffey | |
| 2016/0063821 A1 | 3/2016 | MacIntosh et al. | |
| 2016/0162750 A1* | 6/2016 | Haselhoff | G06V 20/582 382/103 |
| 2016/0269714 A1 | 9/2016 | Rhemann et al. | |
| 2016/0364634 A1 | 12/2016 | Davis et al. | |
| 2017/0039765 A1 | 2/2017 | Zhou et al. | |
| 2017/0054965 A1 | 2/2017 | Raab et al. | |
| 2017/0178301 A1* | 6/2017 | Moraleda | G06T 3/0006 |
| 2017/0228905 A1* | 8/2017 | Dabrowski | G06T 11/00 |
| 2017/0286809 A1 | 10/2017 | Pankanti et al. | |
| 2018/0075618 A1 | 3/2018 | Lai et al. | |
| 2019/0057438 A1 | 2/2019 | Dhankhar | |
| 2019/0065823 A1 | 2/2019 | Srivastava et al. | |
| 2019/0096198 A1 | 3/2019 | Anders et al. | |
| 2019/0108396 A1 | 4/2019 | Dal Mutto et al. | |
| 2019/0228855 A1 | 7/2019 | Leifer et al. | |
| 2019/0270118 A1 | 9/2019 | Araujo-Simon | |
| 2019/0318405 A1 | 10/2019 | Hu et al. | |
| 2020/0019921 A1 | 1/2020 | Buibas et al. | |
| 2020/0258309 A1* | 8/2020 | Holzer | G06T 7/70 |
| 2021/0156963 A1* | 5/2021 | Popov | G06N 3/045 |
| 2021/0225017 A1* | 7/2021 | Holzer | G06T 15/205 |
| 2021/0225038 A1* | 7/2021 | Holzer | G06T 7/246 |
| 2021/0256724 A1* | 8/2021 | Srivastava | G06T 7/557 |
| 2021/0272088 A1 | 9/2021 | Srivastava et al. | |
| 2021/0342588 A1 | 11/2021 | Davis et al. | |
| 2022/0165074 A1 | 5/2022 | Srivastava et al. | |

FOREIGN PATENT DOCUMENTS

| | | | | |
|---|---|---|---|---|
| CN | 112004645 A | | 11/2020 | |
| CN | 112904370 A | * | 6/2021 | B60W 60/0011 |
| JP | 06221832 A | * | 8/1994 | |
| WO | 2016077798 A1 | | 5/2016 | |
| WO | WO-2016077798 A1 | * | 5/2016 | G02B 27/01 |
| WO | WO-2017021751 A1 | * | 2/2017 | G05D 1/0094 |

OTHER PUBLICATIONS 3D reconstruction from multiple images—Wikipedia.
https://www.analyticsvidhya.com/blog/2019/07/computer-vision-implementing-mask-r-cnn-image-segmentation/.
Notely et al. "Examining the Use of Neural Networks for Feature Extraction: A Comparative Analysis using Deep Learning, Support Vector Machines, and K-Nearest Neighbor Classifiers" arXiv:1805.02294v2 [cs.LG] Jun. 12, 2018.
Srivastava, Abhinai , et al., "Multi-Batch Self-Checkout System and Method of Use", U.S. Appl. No. 17/945,912, filed Sep. 15, 2022.

* cited by examiner

SYSTEM AND METHOD FOR IDENTIFYING ITEMS

CROSS-REFERENCE TO RELATED APPLICATIONS

This application is a continuation of U.S. application Ser. No. 17/113,757, filed 7 Dec. 2020, which claims the benefit of U.S. Provisional Application Ser. No. 62/945,032, filed on 6 Dec. 2019, which is incorporated in its entirety by this reference.

TECHNICAL FIELD

This invention relates generally to the computer vision field, and more specifically to a new and useful system and method for item recognition from scenes.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
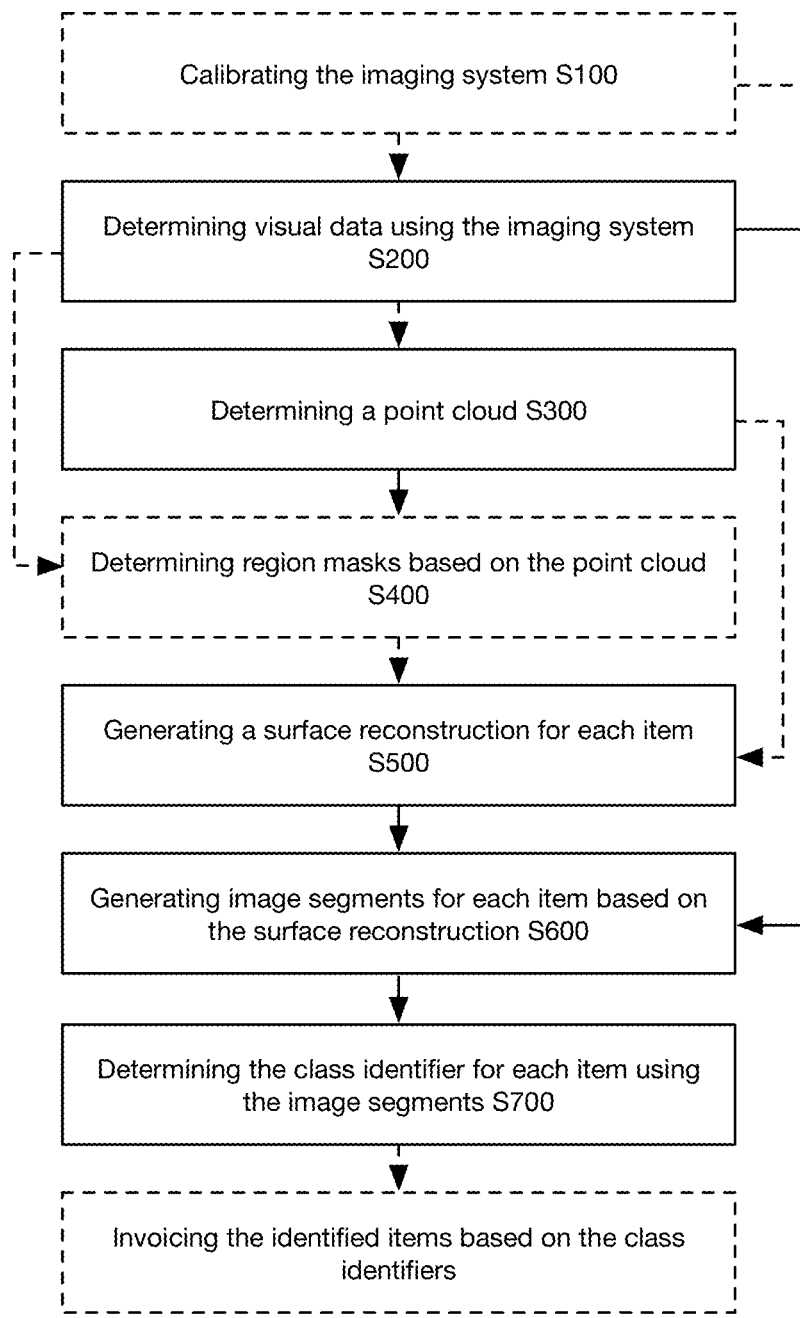
FIG. 1 depicts a schematic representation of the method.

As shown in FIG. 1, the method for item recognition can include: optionally calibrating a sampling system S100, determining visual data using the sampling system S200, determining a point cloud S300, determining region masks based on the point cloud S400, generating a surface reconstruction for each item S500, generating image segments for each item based on the surface reconstruction S600, and determining a class identifier for each item using the image segments S700.

Figure 2:
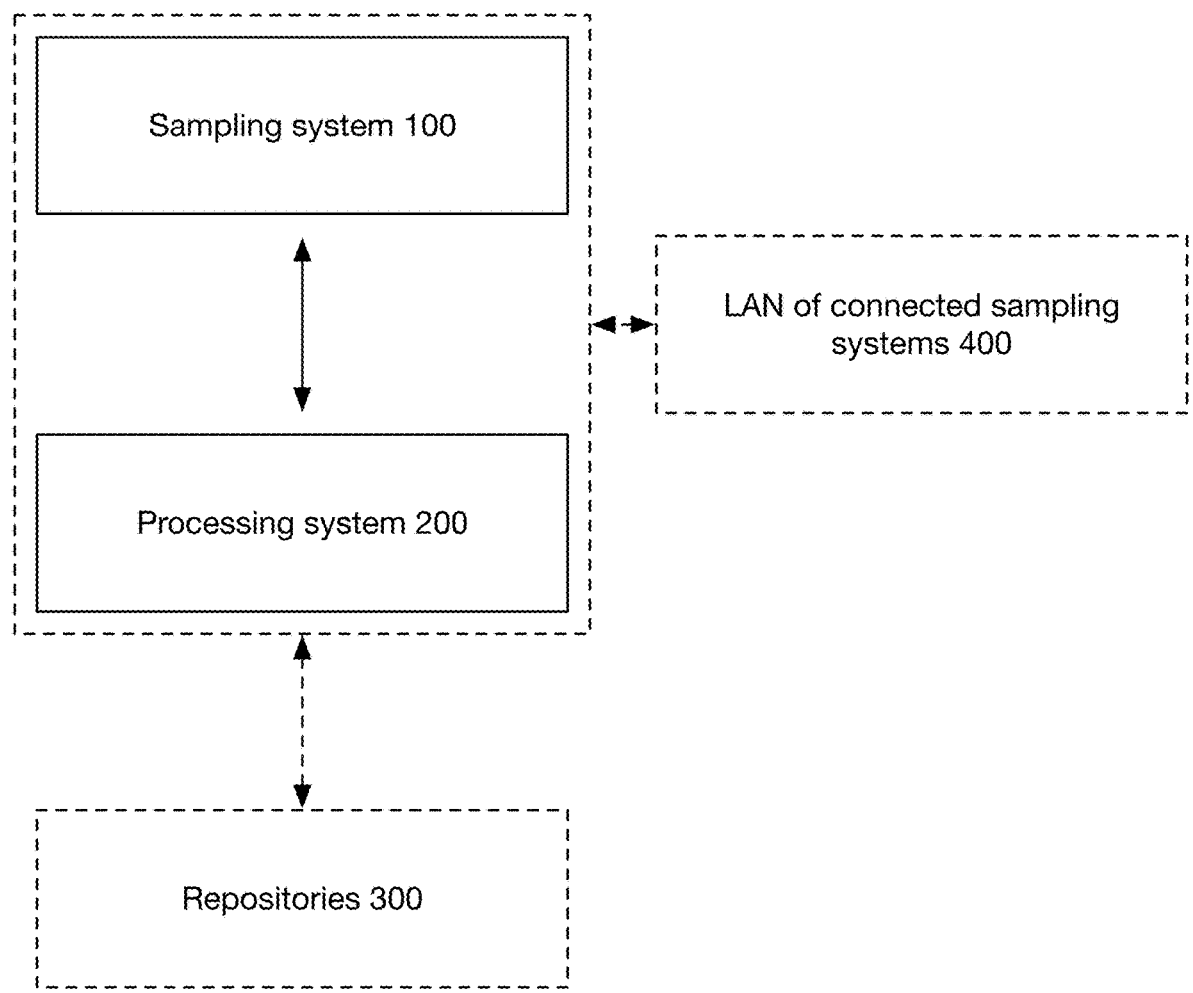
FIG. 2 depicts a schematic representation of the system.

As shown in FIG. 2, the system for item recognition can include: a sampling system 100, a processing system 200, optionally one or more repositories 300, optionally a local area network 400, and/or any other suitable components.

2. Examples

In a first example, the method can include: determining a set of images of a set of items; generating a point cloud using the set of images; determining a height map using the point cloud; determining a region mask for each item using a segmentation classifier that ingests the height map as input; generating a coarse mesh for each item using the region mask and, optionally, the height map; determining an image segment for each item by projecting the respective coarse mesh into a camera frame for each image; determining a class identifier for each item using the image segments; and optionally invoicing the identified items based on the class identifiers.

In this example, the method can optionally include determining a calibration matrix for each camera and using the respective calibration matrix to generate the point cloud and/or project the coarse mesh into the respective camera frame.

3. Benefits.

The method confers several benefits over conventional systems.

First, the method can improve item segmentation and identification accuracy by leveraging 3D visual data instead of processing only 2D data. For example, a point cloud can be used to determine the item contours in each image frame for 2D image segmentation of each item in the scene. In a second example, both 2D image segments and 3D geometric segments can be used to identify the item.

Second, in some variants, the method can segment images faster and/or more efficiently than conventional systems. This can be accomplished by leveraging height maps (e.g., based on a top-down view of the point cloud) to: segment the volumetric space (e.g., the 3D space, the point cloud), generate the region masks, and/or generate the surface reconstruction (e.g., by projecting a resultant region mask downward to generate a convex hull, instead of attempting to identify an item's side contours). The inventors have discovered that, in commercial applications, a top-down view can be sufficient to segment checkout items, because users oftentimes do not stack items on top of each other (and/or the items are oddly shaped and do not stack well). The height map can increase segmentation and/or masking speed by reducing the number of 3D points to process—in examples, using the height map (e.g., instead of the point cloud) can reduce the number of 3D points to process by 80-90%. To further increase speed, in some variants, the point cloud is quantized before generating the height map, which can further reduce the information to be processed at segmentation.

However, variants of the technology can confer any other suitable benefits and/or advantages.

4. System.

The method is preferably performed using a system 20, including: one or more sampling systems 100, and one or more processing systems 200, optionally one or more repositories 300, optionally a local area network 400, and/or any other components.

Figure 3:
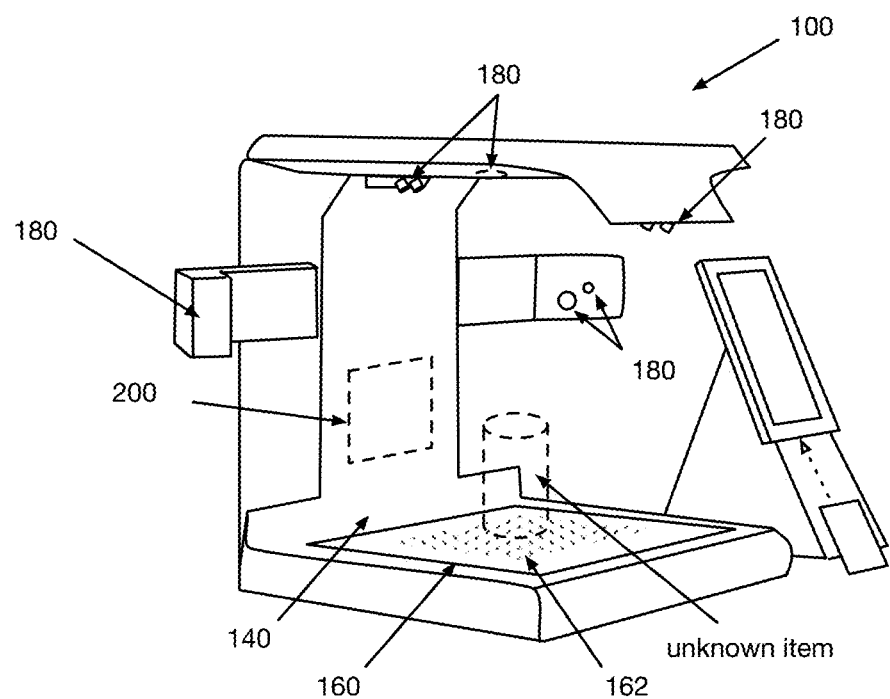
FIG. 3 depicts an example of the system.
Figure 4:
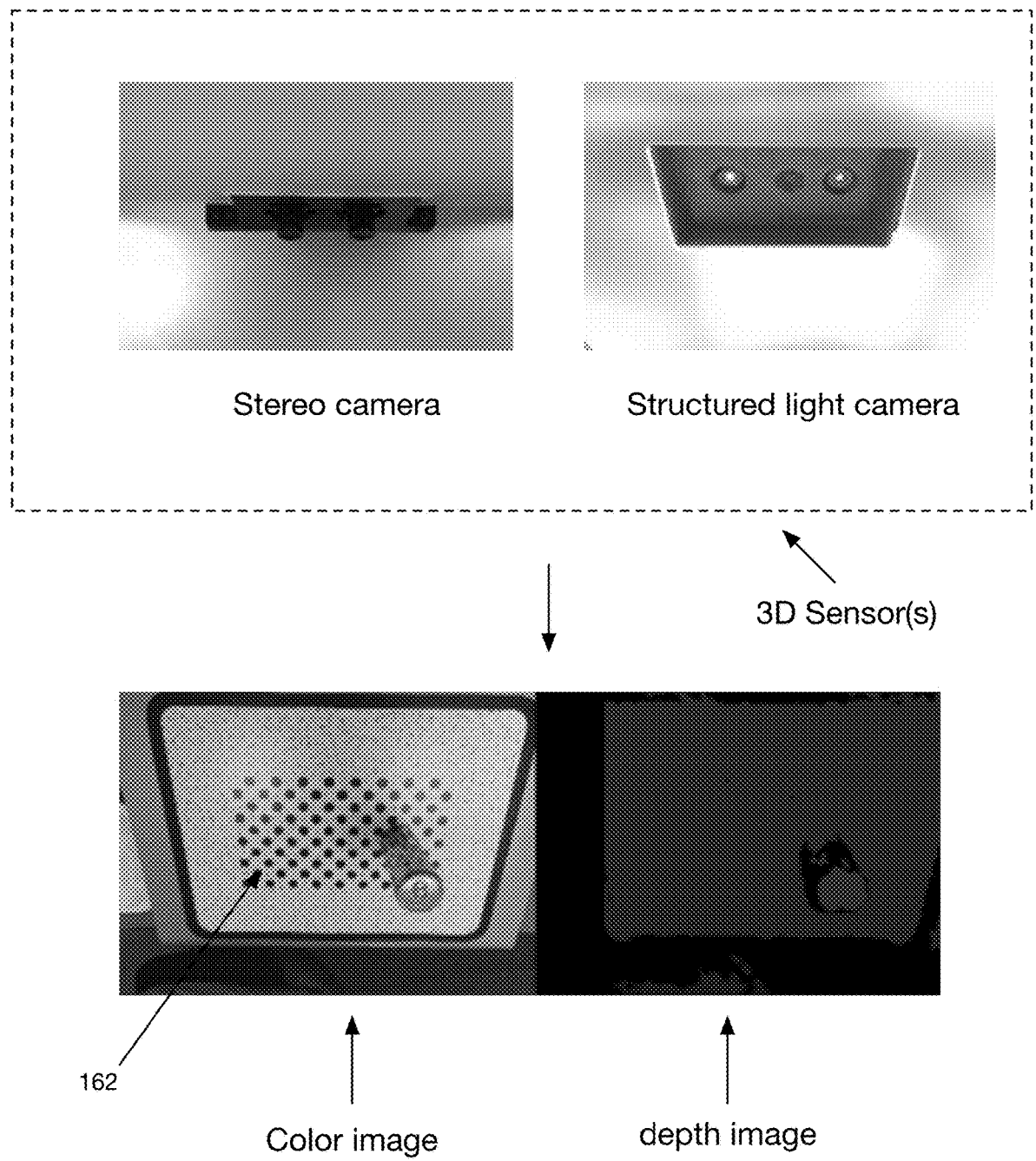
FIG. 4 depicts an example of the imaging system.
Figure 5:
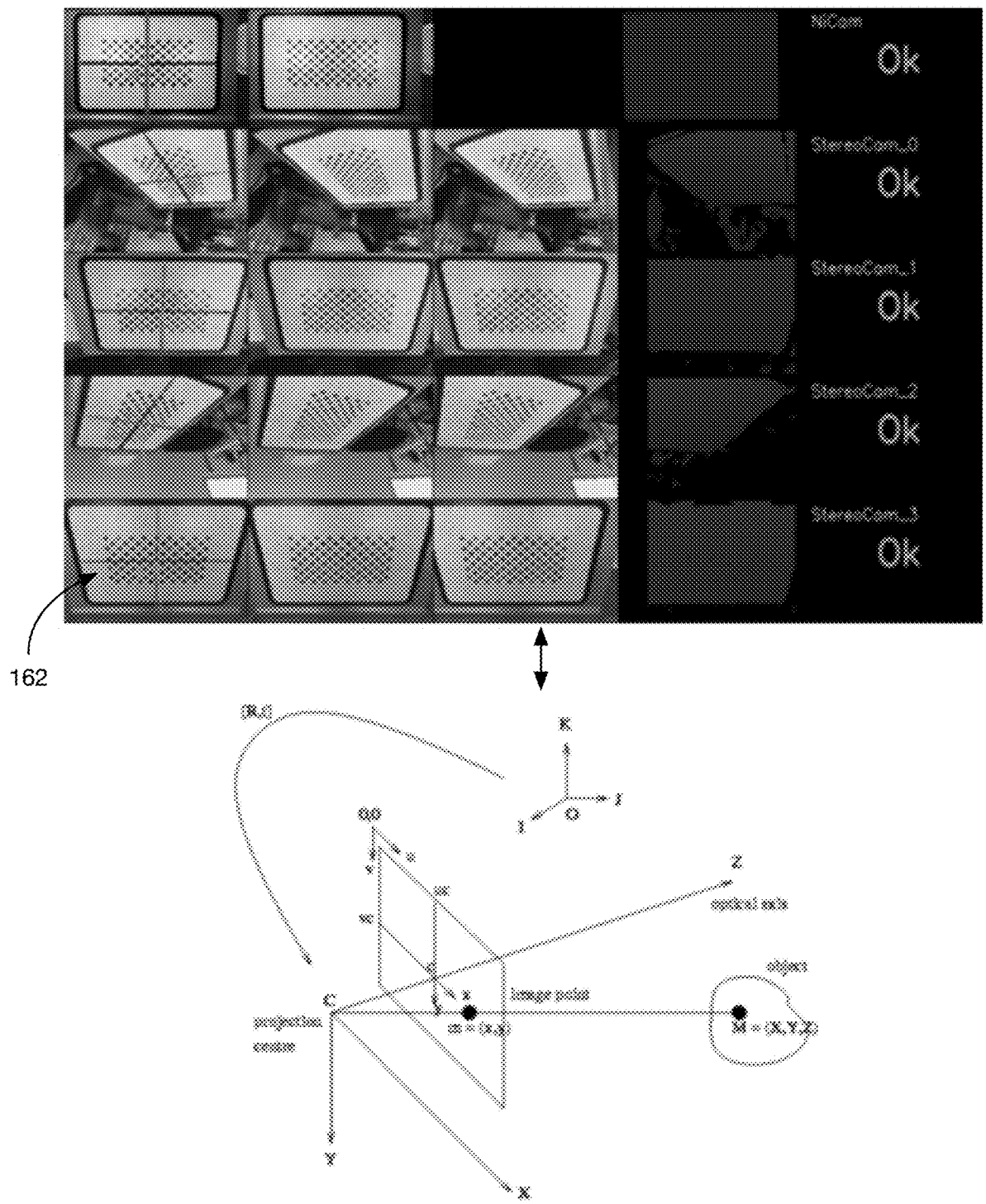
FIG. 5 depicts an example of S100.
Figure 6:
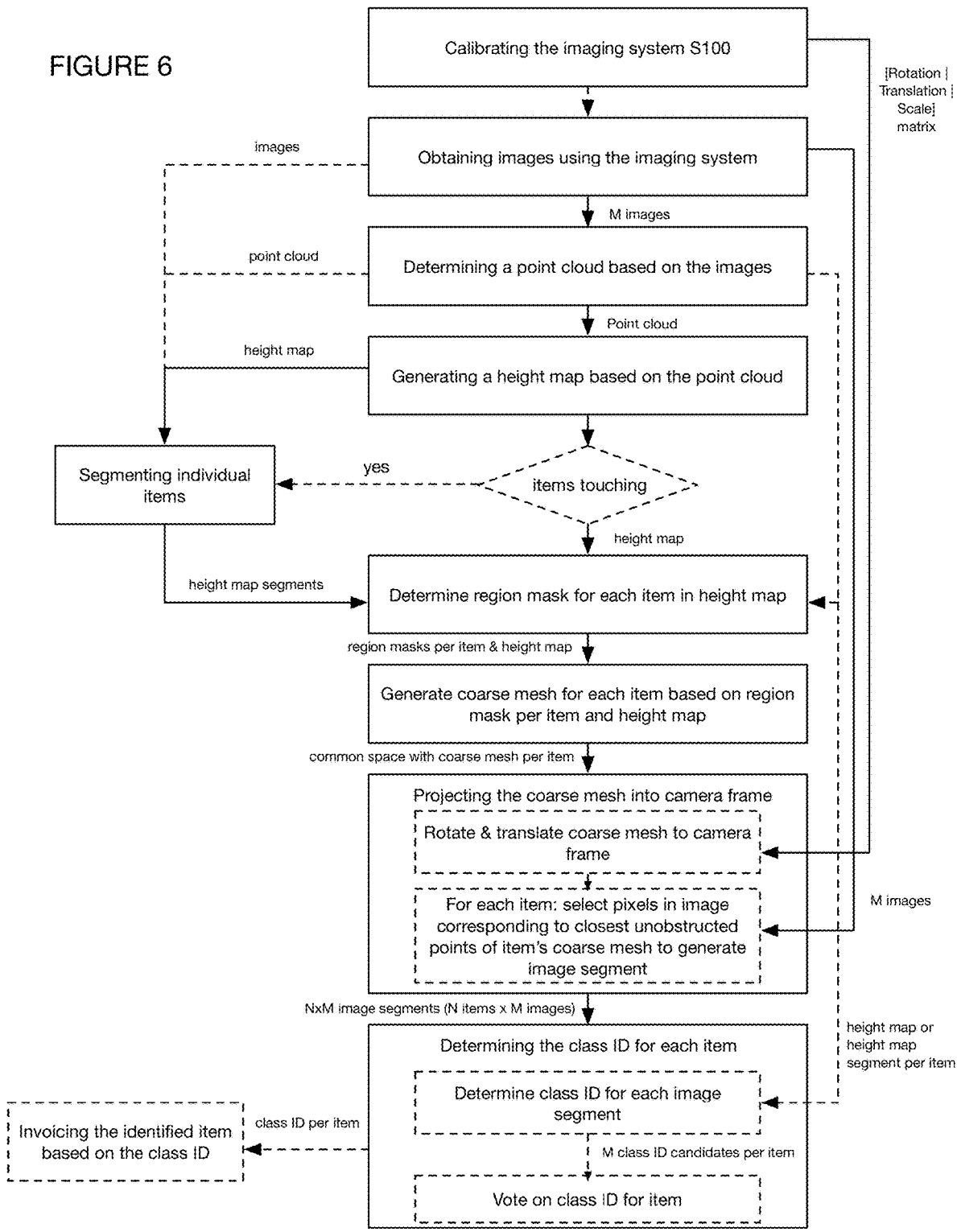
FIG. 6 depicts a flowchart diagram of a variant of the method.
Figure 7:
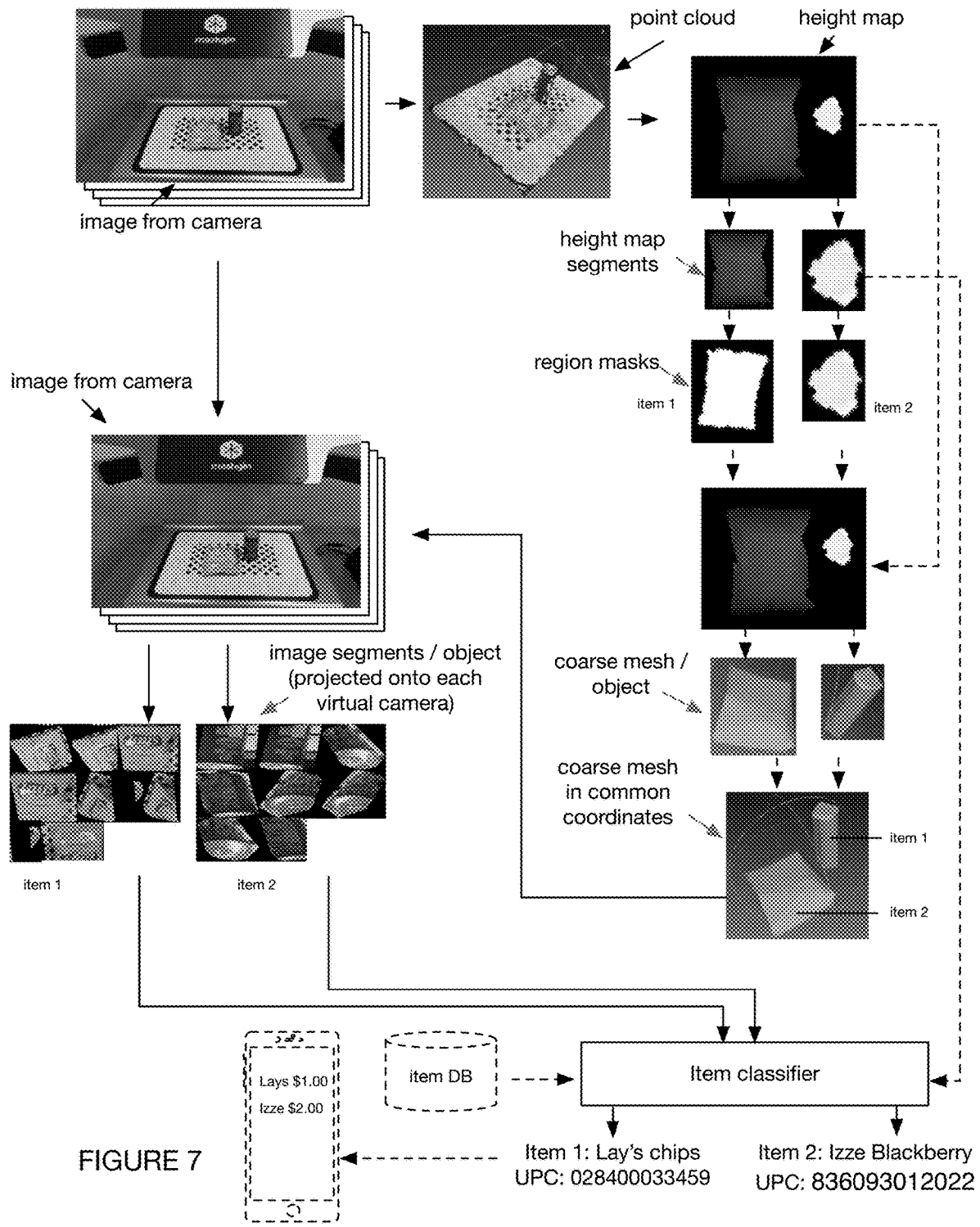
FIG. 7 depicts an illustrative representation of an example of the method.

The sampling system 100 functions to sample images of the items. The sampling system can include: a housing 120 defining a measurement volume 140, and a set of sensors 180 monitoring the measurement volume 140 (e.g., shown in FIG. 3). The sampling system 100 is preferably located at the edge (e.g., onsite at a user facility), but can alternatively be located in another venue.

The housing 120 of the sampling system functions to define the measurement volume 140 (e.g., measurement volume), and can optionally retain the sensors in a predetermined configuration about the measurement volume. The housing 120 can optionally define one or more item insertion regions (e.g., between housing walls, between housing arms, along the sides or top of the measurement volume, etc.) along one or more sides of the housing. The housing can include: a base 160 and one or more arms, wherein the measurement volume is defined between the base and arm(s).

The base 160 is preferably static relative to the arms and/or sensors, but can alternatively be mobile (e.g., be a conveyor belt). The base preferably includes a calibration pattern, but can alternatively have no pattern, have a solid color (e.g., black), be matte, be reflective, or be otherwise optically configured. However, the base can be otherwise configured.

The calibration pattern 162 preferably functions to enable camera calibration for the imaging system (e.g., enables the system to determine the location of each camera with reference to a common coordinate system). The calibration pattern can be used to determine one or more calibration matrices for: a single camera, a stereocamera pair, and/or any other suitable optical sensor. The calibration matrices can be: intrinsic calibration matrices, extrinsic calibration matrix relating the camera to the measurement volume, extrinsic matrices relating the cameras to each other, and/or other calibration matrices. The calibration pattern is preferably arranged on (e.g., printed on, stuck to, mounted to, etc.) the base of the housing, but can alternatively be arranged along an interior wall, an arm, and/or otherwise arranged. The calibration pattern (or portions thereof) preferably appear in each optical sensor's field of view, but can alternatively appear in all RGB sensors' fields of view, a subset of the optical sensors' fields of view, and/or otherwise appear in the images. The calibration pattern is preferably axially asymmetric (e.g., along one or more axes, such as the x-axis, y-axis, etc.), but can alternatively be symmetric along one or more axes. The calibration pattern can be an array of shapes (e.g., circles, squares, triangles, diamonds, etc.), a checkerboard, an ArUco pattern, a ChArUco pattern, multiple CharuCo targets (e.g., arranged as a checkerboard, grid, etc.), a circle grid pattern, an image, a logo (e.g., of the merchant), and/or any other calibration pattern. The calibration pattern can include one or more colors (e.g., red, green, blue, and/or various shades or combinations) and/or be black and white. The parameters of the calibration pattern (e.g., shape size, shape arrangement, pattern alignment with the measurement volume's axes, pattern pose relative to the measurement volume, etc.) are preferably known, but can alternatively be unknown. The calibration can be raised (e.g., less than 1 mm, less than 2 mm, less than 5 mm, etc.) or smooth (e.g., planar). However, the calibration pattern can be otherwise configured.

The arms are preferably static, but can alternatively be actuatable. The arms can extend from the base (e.g., perpendicular to the base, at a non-zero angle to the base, etc.), extend from another arm (e.g., parallel the base, at an angle to the base, etc.), and/or be otherwise configured. The housing can optionally include a top, wherein the top can bound the vertical extent of the measurement volume and optionally control the optical characteristics of the measurement volume (e.g., by blocking ambient light, by supporting lighting systems, etc.). However, the housing can be otherwise configured.

The sensors 180 of the sampling system function to sample measurements of the items within the measurement volume. The sensors are preferably mounted to the arms of the housing, but can alternatively be mounted to the housing side(s), top, bottom, threshold (e.g., of the item insertion region), corners, front, back, and/or any other suitable portion of the housing. The sensors are preferably arranged along one or more sides of the measurement volume, such that the sensors monitor one or more views of the measurement volume (e.g., left, right, front, back, top, bottom, corners, etc.). The sensors can be arranged such that they collectively encompass a predetermined percentage of the measurement volume's points of view (e.g., greater than 20%, greater than 50%, greater than 70%, greater than 80%, etc.), which can provide more viewing angles for an unknown item, but can alternatively encompass a smaller proportion. The sensors can be arranged such that each imaging sensor's field of view encompasses the calibration pattern on the base of the housing, a portion of the calibration pattern (e.g., greater than 60%, greater than 70%, greater than 80%, etc.), none of the calibration pattern, and/or any other feature of the housing or portion thereof. In a specific example, the sensors are arranged along at least the left, right, back, and top of the measurement volume. However, the sensors can be otherwise arranged.

The sampling system preferably includes multiple sensors, but can alternatively include a single sensor. The sensor(s) can include: imaging systems, weight sensors (e.g., arranged in the base), acoustic sensors, touch sensors, proximity sensors, and/or any other suitable sensor. The imaging system functions to output one or more images of the measurement volume (e.g., image of the items within the measurement volume), but can additionally or alternatively output 3D information (e.g., depth output, point cloud, etc.) and/or other information. The imaging system can be a stereocamera system (e.g., including a left and right stereocamera pair), a depth sensor (e.g., projected light sensor, structured light sensor, time of flight sensor, laser, etc.), a monocular camera (e.g., CCD, CMOS), and/or any other suitable imaging system.

In a specific example, the sampling system includes stereocamera systems mounted to at least the left, right, front, and back of the measurement volume, and optionally includes a top-mounted depth sensor. In a second specific example, the sampling system can be any of the systems disclosed in U.S. application Ser. No. 16/168,066 filed 23 Oct. 2018, U.S. application Ser. No. 16/923,674 filed 8 Jul. 2020, U.S. application Ser. No. 16/180,838 filed 5 Nov. 2018, and/or U.S. application Ser. No. 16/104,087 filed 16 Aug. 2018, each of which is incorporated herein in its entirety by this reference. However, the sampling system can be otherwise configured.

The processing system 200 can function to process the set of images to determine the item class. All or a portion of the processing system is preferably local to the sampling system, but can alternatively be remote (e.g., a remote computing system), distributed between the local and remote system, distributed between multiple local systems, distributed between multiple sampling systems, and/or otherwise configured. The processing system preferably includes one or more processors (e.g., CPU, GPU, TPU, microprocessors, etc.). The processing system can optionally include memory (e.g., RAM, flash memory, etc.) or other nonvolatile computer medium configured to store instructions for method execution, repositories, and/or other data. When the processing system is remote or distributed, the system can optionally include one or more communication modules, such as long-range communication modules (e.g., cellular, internet, Wi-Fi, etc.), short range communication modules (e.g., Bluetooth, Zigbee, etc.), local area network modules (e.g., coaxial cable, Ethernet, WiFi, etc.), and/or other communication modules.

The system 20 can include one or more communication modules. (e.g., wireless communication module). The communication modules preferably function to transfer information between the sampling system and the remote computing system. For example, the information transmitted from the sampling system to the remote computing system can include a new or updated item classifier, a new item representation, or any other suitable information. In another example, the information transmitted from the remote computing system to the sampling system can include a new or updated item classifier from the plurality of sampling systems connected by the LAN 400. The communication modules can include long-range communication modules (e.g., supporting long-range wireless protocols), short-range communication modules (e.g., supporting short-range wireless protocols), and/or any other suitable communication modules. The communication modules can include cellular radios (e.g., broadband cellular network radios), such as radios operable to communicate using 3G, 4G, and/or 5G technology, Wi-Fi radios, Bluetooth (e.g., BTLE) radios, NFC modules (e.g., active NFC, passive NFC), Zigbee radios, Z-wave radios, Thread radios, wired communication modules (e.g., wired interfaces such as USB interfaces), and/or any other suitable communication modules.

The system can include one or more item repositories 300, which can store, for a set of identifiable items: one or more item identifiers (e.g., user-readable identifiers, SKU information, etc.); classification information (e.g., patterns, vectors, etc.); pricing; stock; purchase history; and/or any other suitable item information. The item repository can be populated and/or maintained by: a merchant, a central entity, and/or any other suitable entity.

The system can include one or more transaction repositories that function to store transaction information. Transaction information can include: the items purchased (e.g., identifiers thereof); the quantity of each item; the price per item; whether or not the item was identified; payment information (e.g., a transaction number, a hash of the credit card, etc.); the probability or confidence of item identification; the transaction timestamp; and/or any other suitable information generated during the transaction.

The system can optionally include one or more local area networks (LANs) 400 of connected systems. The LAN preferably functions to ensure information processing completed by a first sampling system is forwarded to other sampling systems connected by the LAN as opposed to completing information processing at all sampling systems. This preferred functionality can ensure reliability of sampling systems connected by the LAN (e.g., all machines are operating with the same items and same model), but can incur any other suitable benefit. The LAN can additionally or alternatively function to forward an item repository, or enable any other suitable function.

In one variation, a first kiosk in the LAN can function as the master, and the rest can function as slaves. The master can specify how data should be routed between the systems connected by the LAN or perform any other suitable set of functionalities.

In a second variation, the remote computing system can function as a router. The remote computing system can specify how data should be routed between the sampling systems connected by the LAN or perform any other suitable set of functionalities.

However, the system can additionally or alternatively include any other suitable elements.

5. Method.

The method for item recognition can include: optionally calibrating a sampling system S100, determining visual data using the sampling system S200, determining a point cloud S300, determining region masks based on the point cloud S400, generating a surface reconstruction for each item S500, generating image segments for each item based on the surface reconstruction S600, determining a class identifier for each item using the image segments S700, and/or any other suitable elements.

The method functions to automatically identify unknown items appearing within a measurement volume. The method can optionally automatically present checkout information for the identified items, automatically charge for the identified items, automatically decrement an inventory count for the identified (or purchased) items, automatically generate a transaction history for the identified items, or otherwise manage the identified items. In examples, this can enable automated checkout without a cashier or other user in the loop.

The method is preferably performed in real- or near-real time (e.g., less than 100 milliseconds, less than 1 second, within 1 second, within 5 seconds, etc.), but can additionally or alternatively be performed asynchronously or with any other suitable frequency.

All elements or a subset of elements of the method are preferably performed by the system, but can additionally or alternatively be performed by any other suitable system.

5.1 Calibrating a Sampling System.

Calibrating a sampling system S100 can function to determine one or more calibration matrices (e.g., bi-directional mapping, uni-directional mapping, etc.) between a camera coordinate system and a common coordinate system for each camera of the imaging system. S100 is preferably performed before S200, but can additionally or alternatively be performed after (e.g., to update the calibration matrices for subsequent identification). S100 can be performed: before each identification session, periodically (e.g., at a predetermined frequency such as every minute, every 2 minutes, every 3 minutes, every 5 minutes, etc.), in response to determination that the system and/or a sensor is miscalibrated, or at any other suitable time. S100 can additionally or alternatively be performed at the factory, in situ (e.g., during operation, between operation sessions, such that the system is self-calibrating or self-healing), in real-time, during S200, and/or at any other suitable time.

The calibration matrices can be a coordinate transformation function. The calibration matrices can include rotation, translation, and scale information, and/or any other suitable information. The calibration matrices are preferably determined based on the calibration pattern (e.g., located on the base of the housing), but can be otherwise determined.

In a first variation, the calibration matrices are those described in U.S. application Ser. No. 15/685,455 filed 24 Aug. 2017, incorporated herein in its entirety by this reference.

In a second variation, calibrating the system can include triangulation, projective reconstruction and factorization, affine reconstruction and factorization, bundle adjustment and/or be otherwise calibrated.

In a third variation, calibrating the system can include: sampling an observation with each sensor; detecting a common calibration pattern (shared between the sensors) within the observation; and computing the transformation matrix based on the pose of the calibration pattern relative to the camera coordinate system. When the sensor is a color camera, the observation can be a color image and the calibration pattern can be a pattern (e.g., dot pattern, square pattern, etc.) arranged on the system base. When the sensor is a depth sensor, the observation can be a depth map and the calibration pattern can be a depth corresponding to the base (e.g., predetermined depth, predetermined number of depth points sharing a common depth, depth points that fit to a common plane, etc.). However, the system can be otherwise calibrated.

However, S100 can additionally or alternatively include any other suitable elements performed in any suitable manner.

5.2 Determining Visual Data Using the Sampling System.

Determining visual data using the sampling system S200 can function to determine visual data of the measurement volume for item recognition. S200 is preferably performed after calibrating the sampling system, but can additionally or alternatively be performed contemporaneously or before. S200 is preferably performed after items are placed in a measurement volume (e.g., when the base is occluded, when a motion sensor detects motion within the measurement volume, when a weight sensor connected to the base is triggered, etc.), but can additionally or alternatively be performed contemporaneously or before. S200 is preferably performed by the imaging system, wherein the imaging system includes a plurality of cameras (e.g., M cameras), but can additionally or alternatively be performed by any other suitable system. The plurality of cameras preferably include multiple stereo camera pairs and a structured light camera (e.g., as discussed above), but can additionally or alternatively include any other suitable cameras. Different cameras of the plurality preferably sample (e.g., take images of) the measurement volume contemporaneously or concurrently, but can sample the measurement volume sequentially (e.g., to minimize lighting interference), in parallel, in a predetermined order, or in any other order.

The visual data is preferably a set of images, wherein each image within the set is captured by a different camera. Additionally or alternatively, the visual data can be a single image, constant stream (e.g., video), depth information (e.g., a point cloud, a depth map, etc.), structured light image, height maps, 3D images, 2D images, or any other suitable visual data. The image is preferably a color image (RGB image), but can alternatively be a color image with depth information (e.g., associated with each pixel of the color image, such as that generated from a stereocamera pair), be a depth image, and/or be any other suitable image.

Each instance of S200 can include sampling one or more images with each camera (and/or camera pair); when multiple images are sampled by a camera, the multiple images can be averaged, reduced to a single image (e.g., the clearest image is selected from the plurality), or otherwise processed.

The set of images are preferably images of a scene, but can additionally or alternatively be images of any other suitable element. The scene preferably includes one or more items, but can additionally or alternatively include the calibration pattern, a known fiducial, and/or any other suitable elements. Each image preferably captures one or more of the items within the scene, and can optionally capture the calibration pattern, the known fiducial, and/or other scene elements. The set of images preferably captures a plurality of views of the scene (e.g., M views of the scene, M/2 views of the scene, (M-1)/2 views of the scene, etc.), but can additionally or alternatively capture a single view or any other suitable view. The plurality of views preferably include a front view, a left side view, a right side view, a back view, but can additionally or alternatively include any other suitable view. The images are preferably aligned and/or registered with a camera frame and the common coordinate system (e.g., using the calibration matrices determined from S100). The set of images preferably includes 8 or more images, but can additionally or alternatively include 1 image, less than 5 images, less than 10 images, or any other suitable number of images. The set of images preferably includes a color 2D image and a depth image, but can additionally or alternatively include any other suitable images.

However, S200 can additionally or alternatively include any other suitable elements performed in any suitable manner.

5.3 Determining a Point Cloud.

Determining a point cloud S300 functions to determine geometric information about the items within the measurement volume. The registration can be based on the calibration matrices determined in S100 and/or any other suitable calibration information. S300 is preferably performed after S200, but can additionally or alternatively be performed during or before. S300 is preferably performed after determination of the calibration matrices, but can additionally or alternatively be performed contemporaneously. The point cloud is preferably determined using the visual data determined in S200, but can additionally or alternatively be generated using known geometries, probe routines, time of flight measurements, or other data. The visual data is preferably transformed into the point cloud based on the calibration matrices but can additionally or alternatively be transformed based on any other suitable transformation. After point cloud generation, the point cloud can be quantized (e.g., 1 mm cubed, 2 mm cubed, 1 cm cubed, etc.) and/or otherwise manipulated.

In one variation, the point cloud is determined using methods described in U.S. application Ser. No. 15/685,455 filed 24 Aug. 2017, incorporated herein in its entirety by this reference.

In a second variation. S300 determines the point cloud by determining a depth of an item feature from the sensor, (e.g., depth per pixel in a camera coordinate system), and mapping the feature depth to the common coordinate system using the calibration matrices determined in S100. In a first embodiment, determining the feature depth can include triangulating a depth of a common feature found between two images of a stereoimage pair. In a second embodiment, the feature depth can be measured by a depth sensor (e.g., structured light sensor). However, the feature depth (e.g., feature distance away from the sensor) can be otherwise determined.

In a third variation, S300 can determine the point cloud based on projective reconstruction and factorization, affine reconstruction and factorization, bundle adjustment, or using any other suitable technique.

In a fourth variation, S300 includes combining points from a plurality of sensors (e.g., structured light sensors, stereocameras, etc.) to form the point cloud.

In a first example, the visual data can be a plurality of 2D stereo color images and depth images. Points can be individually determined from each stereocamera image and depth image, and collectively merged, using the respective common coordinate transformation matrices (e.g., calibration matrices), into a point cloud within a common (virtual) space.

However, S300 can additionally or alternatively include any other suitable elements performed in any suitable manner.

5.4 Determining Region Masks Based on the Point Cloud S400.

Determining region masks based on the point cloud S400 preferably functions to determine volumetric or geometric segments for each item in the measurement volume. Region masks for individual items are preferably determined concurrently (e.g., as a batch), but can additionally or alternatively be individually determined (e.g., serially), or in any other suitable order.

The region masks are preferably defined in a common virtual space (e.g., the geometric representation, the point cloud, etc.), but can additionally or alternatively be defined: in each image, in a camera frame, and/or in any other suitable virtual space. The region masks can include: a bounding box (e.g., in the x-y plane); boundaries in the x-y plane; one or more areas in the x-y plane; one or more 3D regions in the x, y, z volume, and/or be otherwise defined. The region mask is preferably a binary mask (e.g., each pixel value is 1 if the pixel corresponds to an item and o otherwise, but can alternatively be any other suitable mask. The region mask is preferably 2D, but can alternatively be 3D, 2.5D (e.g., have contours for only a subset of the point cloud or measurement volume), and/or have any other suitable dimensions. The region mask is preferably subsequently applied to the point cloud and/or a geometric representation (e.g., to determine the 3D blobs and/or height maps for each individual item), but can additionally or alternatively otherwise used. The region masks are preferably a height map masks, but can additionally or alternatively be a mask for the point cloud, and/or mask for any other suitable data. Each region mask can be representative of a separate and distinct item (e.g., associated with a single PLU, associated with unitary packaging, etc.), but can additionally or alternatively be representative of multiple items. In a first example, a single region mask can encompass a 6-pack of cans. In a second example, each can is associated with a different region mask, wherein a 6-pack is split into 6 region masks. Each region mask can be associated with a mask identifier (e.g., generic, alphanumeric, etc.) representative of a separate and distinct item. S400 can generate one or more masks. For example, S400 can generate: a mask per item; multiple masks per item; a single mask for multiple items; and/or any suitable number of masks for any suitable number of items in the measurement volume.

The region masks can be generated by: segmenting the point cloud itself, segmenting a geometric representation (e.g., height map) of the point cloud, segmenting the images of the visual data, segmenting any other data, and/or otherwise determined.

The region masks are preferably determined using a segmentation classifier, but can additionally or alternatively be determined using edge based methods (e.g., gradient based algorithms, scan line grouping algorithms, binary contour extraction, etc.), using graph-based methods (e.g., KNN, Markov Random Field, etc.), using foreground/background segmentation, a set of rules (e.g., determining a line that divides adjoining items a planar or elevation view and extending the line through the orthogonal plane to segment the volume; filtering for items or pixels with a height matching each of a predetermined set of heights, where contiguous pixels having the same height can be considered a segment), and/or any other suitable technique.

The segmentation classifier can leverage: semantic segmentation, instance-based segmentation, rules, heuristics, and/or any other suitable segmentation technique. The segmentation classifier can be a region-based algorithm (e.g., MaskRCNN, RCNN, FastRCNN, FasterRCNN, etc.; seeded-region methods, unseeded-region methods, etc.) and/or any other suitable algorithm. The segmentation algorithm can output: individual region masks (e.g., for each item), a boundary that is subsequently used to determine a region mask (e.g., a linear boundary, an item boundary, etc.), and/or any other suitable data. The segmentation classifier is preferably trained, but can additionally or alternatively be a non-parametric model, a pre-trained model, or otherwise specified. The segmentation classifier is preferably trained using training data (e.g., synthetic data, real data, etc.), but can additionally or alternatively include any other suitable data.

In a first variation, the segmentation classifier can be trained using synthetic images (e.g., synthetic images can be generated using a generative adversarial network; generated using heuristics, random sampling, etc.). The generative adversarial network can generate new orientations of items similar to the orientations represented in the training data. Generating the synthetic images can include geometrically combining geometric representations (e.g., height maps) for multiple items (e.g., randomly selected items), adding noise, or otherwise generating synthetic images and/or generating synthetic point clouds. Geometric combination can include: rotation, translation, collision, placing the items in different x, y, and/or z positions (e.g., different positions for item centroids can be randomly selected, deterministically sampled, etc.), or any other suitable combination.

In a second variation, the segmentation classifier can be trained using real data. The real data can be collected by the imaging system. Each item can be added to the scene sequentially. After each item placement, the sampling system can take a difference in the scene (e.g., the difference between the previous scene and the observed scene) to obtain a mask for the item.

However, the segmentation classifier can be otherwise determined.

In a first variation, S400, can include segmenting the point cloud directly using the segmentation classifier, wherein each region mask is a 3D point cloud segment.

In a second variation, S400 includes: generating a geometric representation based on the point cloud, and determining region masks for each item based on the geometric representation (e.g., using the segmentation classifier).

Generating a geometric representation based on the point cloud can function to determine a representative view of the item based on the point cloud. The geometric representation is preferably determined based on the point cloud, but can additionally or alternatively be based on any other suitable data. The geometric representation is preferably based on a top view of the input data, but can additionally or alternatively be based on a side view, or any other suitable view. For example, when the geometric representation is based on a back view of the point cloud, the geometric representation will include the (x, y, z) coordinates associated with the minimum y value (e.g., the points closest to the back view). The output data is preferably a subset of points of the point cloud, but can additionally or alternatively include any other suitable representation.

The geometric representation is preferably representative of the items within the measurement volume, but can additionally or alternatively be representative of the entirety of the measurement volume (e.g., including surfaces, such as the base) or any other suitable portion of the measurement volume.

The geometric representation preferably depicts the entire measurement volume (e.g., represents all items within the measurement volume), but can additionally or alternatively represent a single item within the measurement volume, a subset of the items, and/or any suitable portion of the items.

In a first embodiment, the geometric representation is a height map determined from a point cloud (e.g., quantized, not quantized, etc.). The height map is preferably a top-down height map of the measurement volume, but can alternatively be an elevation view and/or other view. The height map can include: a set of points (e.g., the points with the largest z value for each (x,y) combination in the point cloud), a hull (e.g., interpolated over the highest points in the point cloud, interpolated over the entire point cloud, etc.), or be otherwise represented. For example, the height map can be determined based on the top view of the point cloud, wherein the base defines the x, y plane and the z axis extends from the origin of the x, y plane and is perpendicular to the base. The height map can include (x, y, z) coordinates associated with the maximum z value for the (x, y) position. Alternatively, the height map can be determined based on a side view of the point cloud. The axis (e.g., x or y axis) that extends perpendicular to the z-axis and parallel with the base can be used to determine the points closest to the side view that can be maximized or minimized accordingly. For example, if the height map is determined from the left side view, the height map will include points associated with the (x, y, z) coordinates associated with the minimum x value.

In a second embodiment, the geometric representation is a binary mask. The binary mask can be the top view of the point cloud, but can be otherwise determined. In a first example, determining the binary mask includes identifying all x-y coordinates with point cloud points having a height (e.g., z-value) above a predetermined threshold (e.g., o), and setting the remainder of the x-y coordinates to zero. In a second example, determining binary mask includes (x, y, z) coordinates associated with the maximum z value for the (x, y) position and once the subset of points is determined, setting the z values to zero. However, the binary mask can be otherwise determined.

In a third embodiment, the geometric representation is a mesh (e.g., a coarse mesh), and can represent a full- or near-full volumetric representation of the items within the measurement volume. In this embodiment, the geometric representation can include mesh can be a blob representing adjoining items (e.g., items touching each other), or include a different mesh for each individual item.

In a fourth embodiment, the geometric representation is a chordiogram, wherein the chordiogram is determined based on the top view of the point cloud.

Determining the region mask for each item based on the geometric representation functions to segment the volumetric space using the geometric representation. The region mask can include: a mask (e.g., binary image representing the geometric representation segment for an item in 2D or 3D space), an item boundary (e.g., boundary of the geometric representation segment), bounding box, or other segment representation.

In a first embodiment, region masks for each item in the geometric representation are determined by the segmentation classifier described above, wherein the geometric representation is provided to the segmentation classifier and a set of region masks are returned.

In a second embodiment, determining region mask for each item in the geometric representation includes iteratively identifying an item using the geometric representation (e.g., by matching volumes of known items to the contours of the geometric representation) and subtracting the identified item from the geometric representation.

In a third embodiment, determining region mask for each item in the geometric representation includes: determining item boundaries from the geometric representation, and generating a mask for each closed-loop item boundary. In this variation, determining item boundaries from the geometric representation can include: identifying the pixels, voxels, or points within the geometric representation where the height falls below a threshold value or is equal to the base height; determining the transition to one or more minima of the height map; determining continuous regions of the geometric representation (e.g., blob) with a height above a predetermined threshold and taking the boundary of the continuous region; using edge based methods (e.g., gradient based algorithms, binary contour extraction, scan line grouping algorithms, etc.), or otherwise determining the item boundaries.

In a fourth embodiment, determining the region mask for each item in the geometric representation includes: taking the projection of the geometric representation onto an x-y plane (e.g., lowest x-y plane of the height map; bottom plane of the measurement volume; etc.).

However, the geometric representation can be otherwise determined, and the region mask can be otherwise determined from the geometric representation.

In a third variation of S400, segmenting the point cloud is performed using techniques described in U.S. application Ser. No. 15/685,455 filed 24 Aug. 2017, incorporated herein in its entirety by this reference.

In a fourth variation of S400, segmenting the point cloud includes: determining a mask for each item using background subtraction, wherein non-contiguous masks or regions are associated with an item. The remaining (e.g., contiguous) pixels, points, or geometric representations can make up the mask for each item.

In a fifth variation, transparent items can be determined based on the geometric representation, the point cloud, and/or otherwise determined. In this variation, a transparent item can be identified as a region within the geometric representation associated with impossible values or no data (e.g., negative infinity, infinity, etc.). Additionally or alternatively, a transparent item can be detected from the color images. In one example, a transparent item can be detected as a region that excludes the standard calibration pattern (e.g. (x, y, o), or any other suitable coordinate for the background), but is not associated with depth information and/or color values.

In a sixth variation, S400 can optionally include determining whether items are in contact (e.g., within an item boundary). Determining whether items are in contact can be performed: before the masks are determined (e.g., wherein the height map, point cloud, or image is segmented using a segmentation module before mask determination if the items are in contact); after the masks are determined (e.g., wherein a mask with multiple items can be subsequently segmented); not performed (e.g., wherein a segmentation module or classifier is used for all iterations of the method), or performed at any other suitable time.

Determining whether items are in contact can function to determine whether further processing (e.g., additional segmentation steps) need to be performed. Determining whether items are in contact is preferably performed based on the height map, but can additionally or alternatively be based on the point cloud, the set of images, or any other suitable data. Determining whether items are in contact can be performed using background subtraction techniques, analyzing shadows, minima analysis, or using any other suitable technique. In examples, items are considered to be in contact when: the blob boundary (e.g., item blob boundary) includes a neck (e.g., an intermediate region with a smaller width than the surrounding regions); the blob's region of the height map includes an intermediate minima lower than a predetermined threshold; the blob's height map has a sharp height change or discrepancy; the images (e.g., the top-down image) indicates a sharp visual discrepancy; the number of items inserted into the measurement volume (e.g., based on initial item tracking, number of weight increases, etc.) is more than the number of detected individual items in the height map; and/or otherwise determined to be in contact.

Figure 9:
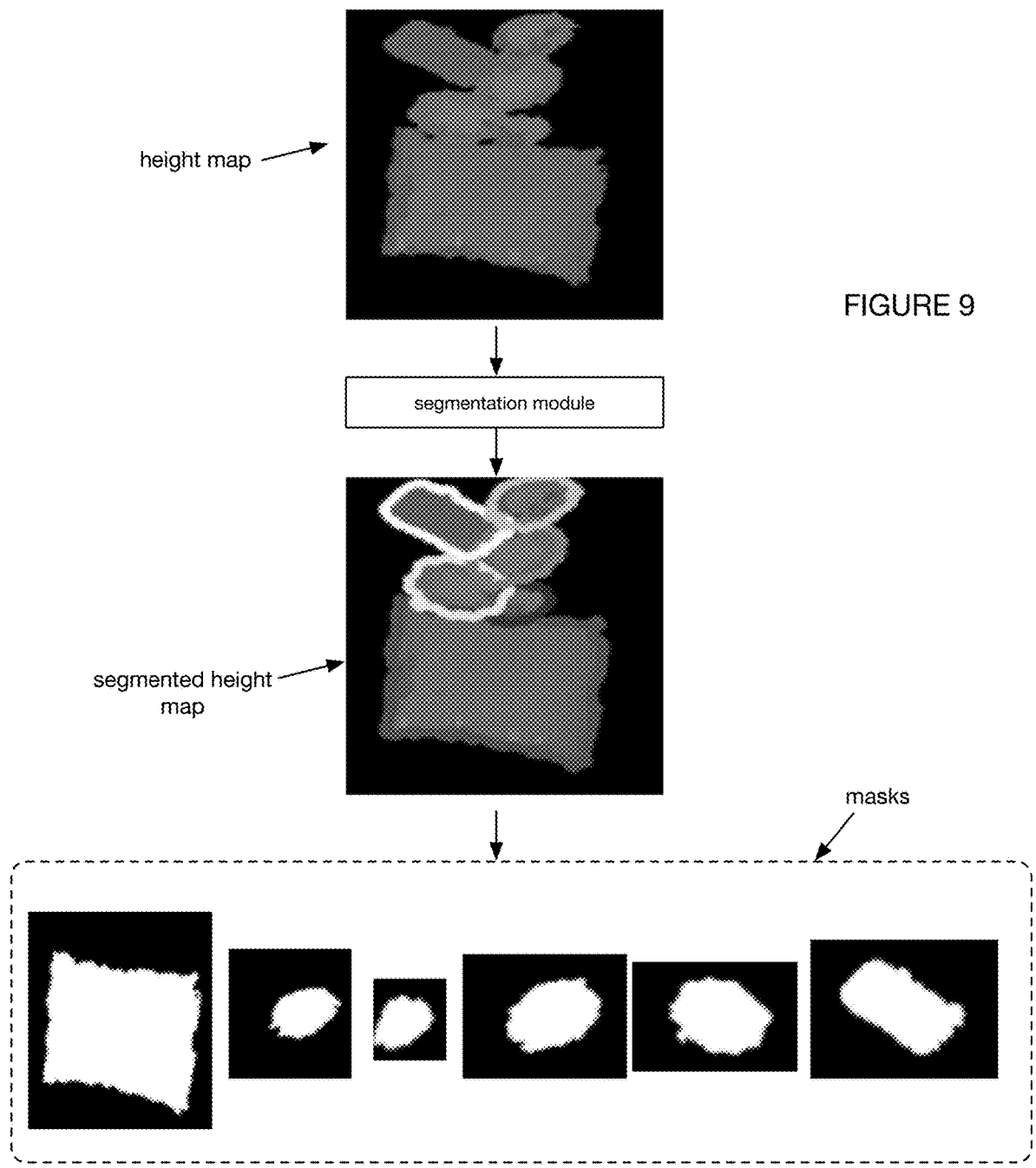
FIG. 9 depicts an example of S400.

In a first specific example, the volumetric representation of the items can be segmented using a MaskRCNN algorithm. The volumetric representation can be a height map generated from the point cloud. The output data is a mask for each item represented by the height map, with binary pixels wherein a 1 represents item pixels and 0 otherwise, or the mask can be otherwise represented. An example is shown in FIG. 9.

In a second specific example, the volumetric representation of the items can be segmented by identifying an inter-item boundary (e.g., based on the height map, based on images associated with the height map region, etc.) and providing a line (e.g., in the x-y plane) extending through the geometric representation along a portion of the inter-item boundary.

However, the region masks can be otherwise determined.

5.5 Generating a Surface Reconstruction for Each Item.

Generating a surface reconstruction for each item S500 can function to determine a more volumetrically complete representation of each unknown, detected item based on the region masks. The surface reconstruction can subsequently be used to register the 3D points in the common coordinate system with the corresponding 2D points in each original camera coordinate system, but can additionally or alternatively be otherwise used. S500 is preferably performed after S400 but can be performed contemporaneously as region masks are determined and/or at any other suitable time.

S500 preferably outputs a set of surface reconstructions, wherein each surface reconstruction within the set corresponds to a different item, but can additionally or alternatively output a surface reconstruction for the entire scene, or output any other suitable surface reconstruction. The set of surface reconstructions are preferably determined within the common coordinate system, but can additionally or alternatively be determined outside of the common coordinate system.

The surface reconstruction generated by the surface reconstruction algorithm is preferably a mesh, but can additionally or alternatively be any other suitable data. The mesh is preferably a coarse mesh, but can additionally or alternatively be a medium mesh, a fine mesh, or any other suitable mesh. The mesh can be structured, unstructured, block structured, or be otherwise structured. The mesh is preferably constructed from a geometric shape (e.g., triangle, diamond, rectangle, etc.), but can additionally or alternatively be a combination of geometric shapes, or otherwise constructed. The mesh is preferably a convex hull, but can additionally or alternatively be of an affine hull, conic hull, or be otherwise defined.

Each surface reconstruction (and/or subelement thereof) is preferably associated with a position in the common coordinate system. The position is preferably determined based on the geometric shape vertices and/or 3D points used to generate said vertices. For example, the mesh can be constructed from triangles that represent the surface of an item. Each vertex of each triangle can be represented as a 3D point in the common coordinate system. However, the surface reconstruction can be otherwise related to the common coordinate system.

The surface reconstruction is preferably generated based on the geometric representation and the region masks, but can additionally or alternatively be generated based on the point cloud and region masks, or based on any other suitable data. For example, the surface reconstruction can be generated based on: the geometric representation, wherein the geometric representation is the height map; a segmented height map (e.g., the entire height map with aligned masks); a height map segment corresponding to a masked region of the height map (e.g., associated with a common coordinate space pose, position, and/or orientation); the point cloud; a segmented point cloud, wherein the point cloud is segmented based on the height map segmentation or masks; a point cloud segment (e.g., determined based on the masks; or any other suitable data.

The input data transformation is preferably a surface reconstruction algorithm (e.g., convex hull algorithm, affine hull algorithm, finite distance, finite element, finite volume, triangulation, poisson, etc.). The surface reconstruction algorithm is preferably based on a view of the point cloud (e.g., the top view, a side view, etc.). The view is preferably a partial view, but can additionally or alternatively be any other suitable view. The partial view is preferably determined based on the region masks determined in S400, but can be determined based on any other suitable data.

The surface reconstruction algorithm can include a plurality of instances or a single instance. When the surface reconstruction algorithm includes a plurality of instances, each instance of the plurality computes a surface reconstruction based on a subset of points of the original point cloud wherein each subset of points corresponds to an item, but the surface reconstruction can be otherwise based. Each subset of points are preferably the points remaining after applying the item masks to different instances of the point cloud. However, the masks can be applied to the same instance of the point cloud, or any other suitable data. Each subset of points are transformed in parallel, but can be transformed sequentially, or in any other suitable order. The surface reconstruction algorithm can process each subset of points using different instances of the algorithm, the same instance of the algorithm, or otherwise process each subset of points.

When the surface reconstruction algorithm includes one instance. The instance computes a surface reconstruction based on the point cloud. The surface reconstruction is then segmented into item segments based on the item masks.

In a first variation, S500 includes: masking the point cloud with the region masks determined in S400 (e.g., identifying all points encompassed by a projection of the region mask downward and/or upward along the z-axis), and generating a convex hull based on the points within each masked region of the point cloud.

In a second variation, S500 includes: segmenting the geometric representation (e.g., height map) using the region masks from S400 and projecting the geometric representation segment (and/or boundaries thereof) downward along a z-axis of the measurement volume or common coordinate system. In a first embodiment, the geometric representation is a hull, wherein projecting the geometric representation segment downward can include creating vertical side surfaces for the hull (e.g., extending downward to the base from the perimeter of the hull or mask). In a second embodiment, the geometric representation is a set of points, wherein a hull is generated based on the points and vertical side surfaces for the hull (e.g., by extending the perimeter of the hull or mask downward). However, the geometric representation can be otherwise used to generate the hull.

In a third variation, S500 includes: generating a convex hull for the height map, and masking the convex hull to identify the convex hull sub-portions that correspond to individual items.

In a fourth variation, when the point cloud is segmented directly, the convex hull can be generated based on the region masks (e.g., point cloud segments).

In a fifth variation, S500 includes: projecting each region mask along the z-axis to generate the sidewalls of the surface reconstruction, and joining the height map with the sidewalls to cooperatively form the convex hull.

However, the surface reconstruction can be otherwise determined.

5.6 Generating Image Segments for Each Item Based on the Surface Reconstruction.

Figure 8:
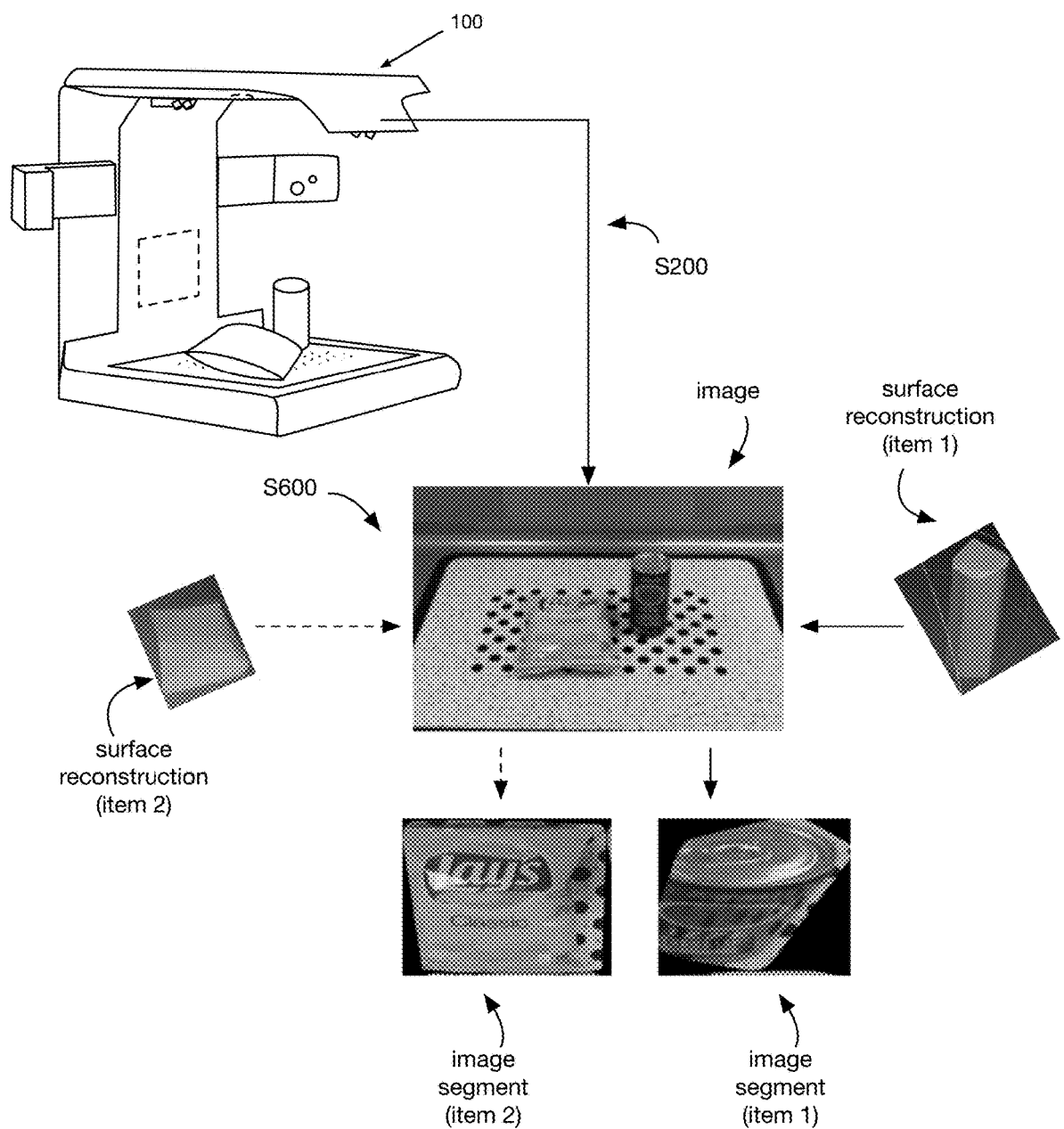
FIG. 8 depicts an example of S600 wherein 3 image segments are determined for the same item based on the convex hull of the item and the associated color image for each respective camera.

Generating image segments for each item based on the surface reconstruction S600 functions to determine the image segments corresponding to a single unknown individual item (e.g., shown in FIG. 8) from each of a set of images. S600 is preferably performed after S500, but can additionally or alternatively be performed contemporaneously.

S600 preferably outputs a set of image segments per item. The cardinality of the set preferably equals the number of input images (e.g., base images), but can have any other suitable number. For example, for M input images, S600 preferably outputs M image segments per item (e.g., when the scene includes N items, S600 outputs N×M image segments). In a specific example, the set of image segments includes an image segment from each image from the image set used to generate the point cloud. In a second specific example, the set of image segments can include an image segment from a subset of the images from the image set (e.g., only the color images). However, any other suitable number of image segments can be output.

Each set of image segments preferably includes only the portions of the respective item appearing in the base image, wherein obscured portions of the respective item and/or substantial portions of other items (e.g., more than a threshold percentage, such as 1%, 5%, 10%, etc.) do not appear in the image segment., However, the set of image segments can include portions of other items, portions of the background, the sampling system, the standard calibration pattern, or any other suitable elements. The edges of the image segment can be defined by the edges of the item (e.g., instance segmentation), defined by a bounding box, or otherwise defined. The pixels of each image are preferably from the color image associated with the respective 3D camera, but can be from any other suitable data.

Different sets of image segments for different items can be determined: concurrently (e.g., in a batch), serially (e.g., for each item, for each image, etc.), or in any other suitable order.

The image segments are preferably determined from the set of color images (e.g., determined in Sam), but can alternatively be determined the depth images or any other suitable data. Each image can be associated with a respective calibration matrix transforming the common coordinate system to the respective camera coordinate system, and/or transforming the camera coordinate system to the common coordinate system, such as those determined in S100. The color images are preferably 2D images from each constituent cameras of the 3D sensors (e.g., the monocular cameras cooperatively forming the stereocameras), but can be any other suitable color images (associated with a transformation from the common coordinate space). The color images preferably include a 2D image from each camera, but can additionally or alternatively include 2D images from a subset of the cameras.

The image segments are preferably determined using the surface reconstruction (e.g., determined in S500), but can additionally or alternatively be determined using the region masks determined in S400, or otherwise determined. S600 can include, for each (unknown) item, projecting the respective surface representation into each camera frame (e.g., associated with each image sampled in Sam), wherein the image segment corresponding to the item is determined from the projection. However, the image segment corresponding to an image can be determined using ray tracing, rasterization, scan line rendering, image order algorithms (e.g., ray casting), object order algorithms (e.g., scan conversion, shear warp, etc.), or otherwise determined.

Projecting a surface representation into a camera frame can include identifying the region of the image frame (e.g., the image's pixels) that map to the shadow of the surface representation on the camera frame (image frame, image space). The projection can be performed in the common coordinate system, in the camera frame, or in any other suitable coordinate system. In a one example, S600 includes transforming the surface representation (e.g., for the item, for the scene, etc.), which is represented in the common coordinate system, to the camera frame or coordinate system (e.g., using the respective calibration matrices determined in S100); and selecting the pixels in the respective image that correspond to the surface representation for the item, wherein the selected pixels (or pixel regions) cooperatively form the image segment. In a second example, S600 includes transforming each image's frame to the common coordinate system (e.g., using the calibration matrices determined in S100), projecting the surface representation onto the image, and selecting the pixels within the projection as the item's image segment. In a first variation, the selected pixels correspond to the unobstructed points or regions of the item's surface representation that are closest to the image's camera frame. In an example, the triangle locations of an item's convex hull are mapped to color image pixel locations to determine the pixels corresponding to the item. In a second example, only portions of the surface representation that are the closest to the image frame (e.g., relative to surface representations for other images in the common coordinate space) are projected. In a third example, S600 includes projecting all surface representations for all items into a given image, identifying image regions (e.g., mesh units, pixels, etc.) that are assigned to (e.g., within the projection of) multiple conflicting surface representations, sorting the conflicting surface representations by proximity to the image frame, and assigning the image region to the item whose surface representation is closest to the image frame. In a fourth example, all surface representations for all images within the measurement volume are concurrently projected into the image frame, and the image's pixels can be assigned to the item whose surface reconstruction projection was unobstructed. In a fifth example, the image is projected into the common coordinate frame (e.g., with the surface representations of the one or more items in the measurement volume), wherein each image pixel is assigned to the first surface reconstruction that the image frame projection intersects. In a sixth example, if multiple triangles of an item's convex hull map to the same image region, a secondary mask is determined. The secondary mask is determined by the triangle closest to the imaging system element (e.g., 3D camera). When the secondary mask is associated with the item (for which the image segment set is being generated), pixels (or one or more image segments within each image) corresponding to the secondary mask can be selected. In a second variation, the selected pixels correspond to the region mask determined in S400.

In a third variation, the entire image segment associated with a surface reconstruction projection can be assigned to the item, irrespective of surface reconstruction obstruction by another item's surface reconstruction.

However, the Image Segments can be Otherwise Determined.

5.7 Determining a Class Identifier for Each Item.

Determining a class identifier (e.g., item identifier) for each item S700 functions to identify the item. S700 is preferably performed after S600, but can additionally or alternatively be performed during or before (e.g., on an image from each camera). S700 is preferably performed by the sampling system, but can additionally or alternatively be performed at the remote computing system or at any other suitable computing system.

The class identifier is preferably determined based on the image segments for each item from S600. The class identifier can optionally be determined based on the geometric representation for the item from S400 or a geometric representation segment corresponding to the item from S500. However, the class identifier can additionally or alternatively be determined based on the original images, the point cloud, features of the input data (e.g., extracting using histogram of oriented gradients (HOG), Scale invariant Feature Transform (SIFT), speeded up robust feature (SURF)., etc.), or any other suitable data.

Class identifiers are preferably determined for each image segment and/or geometric representation (or segment thereof), but can alternatively be determined for: the set of image segments, the set of image segments and geometric representation segments, or for any group of data.

The class identifiers are preferably determined by a standard classifier (e.g., neural network: DNN, CNN, feed forward neural network; regression; nearest neighbors; SVM; etc.), but can alternatively be determined using a set of rules, heuristics, or otherwise determined.

The item classifier functions to determine an item class-ID based on item data, but can additionally or alternatively determine a probability vector corresponding to a subset of the class-IDs (e.g., top 3 class-IDs, top 5 class-IDs), or determine any other suitable output. The item data can include: image segments, point cloud regions, geometric representation segments, and/or any other suitable data. The sampling system can include one or more classifiers for each: data type, camera view, item, and/or other parameters. For example, the sampling system can include: a single classifier that is used for all camera views or different classifiers for each camera view or camera. In another example, sampling system can include: a single classifier for all data types (e.g., the same classifier is used for images and height maps) or the different classifiers for different types of data (e.g., one classifier for images, a second classifier for height maps). In another example, the sampling system can include: a single classifier for all items, different classifiers for each item, different classifiers for each super-class (e.g., wherein item identification can leverage a series of classifiers), and/or any other suitable number of classifiers for any other suitable number of items.

Each classifier of the system preferably accepts a single input, but can additionally or alternatively accept multiple inputs. For example, the classifier can accept a single image segment or a single height map segment; or accept multiple image segments and/or height map segments. However, the item classifier can be otherwise constructed.

In a first variation, S700 includes, for each (unknown) item: determining a set of class candidates; and determining the item identifier from the set of class candidates. Determining the set of class candidates can include: determining a candidate class for each of the set of image segments associated with the respective item using an image classifier, and optionally determining a candidate class for the respective geometric representation segment using a geometric classifier, wherein the resultant candidate classes cooperatively form the set of class candidates. The image classifiers used to classify each image segment is preferably the same image classifier, but can alternatively be different image classifiers.

Figure 10:
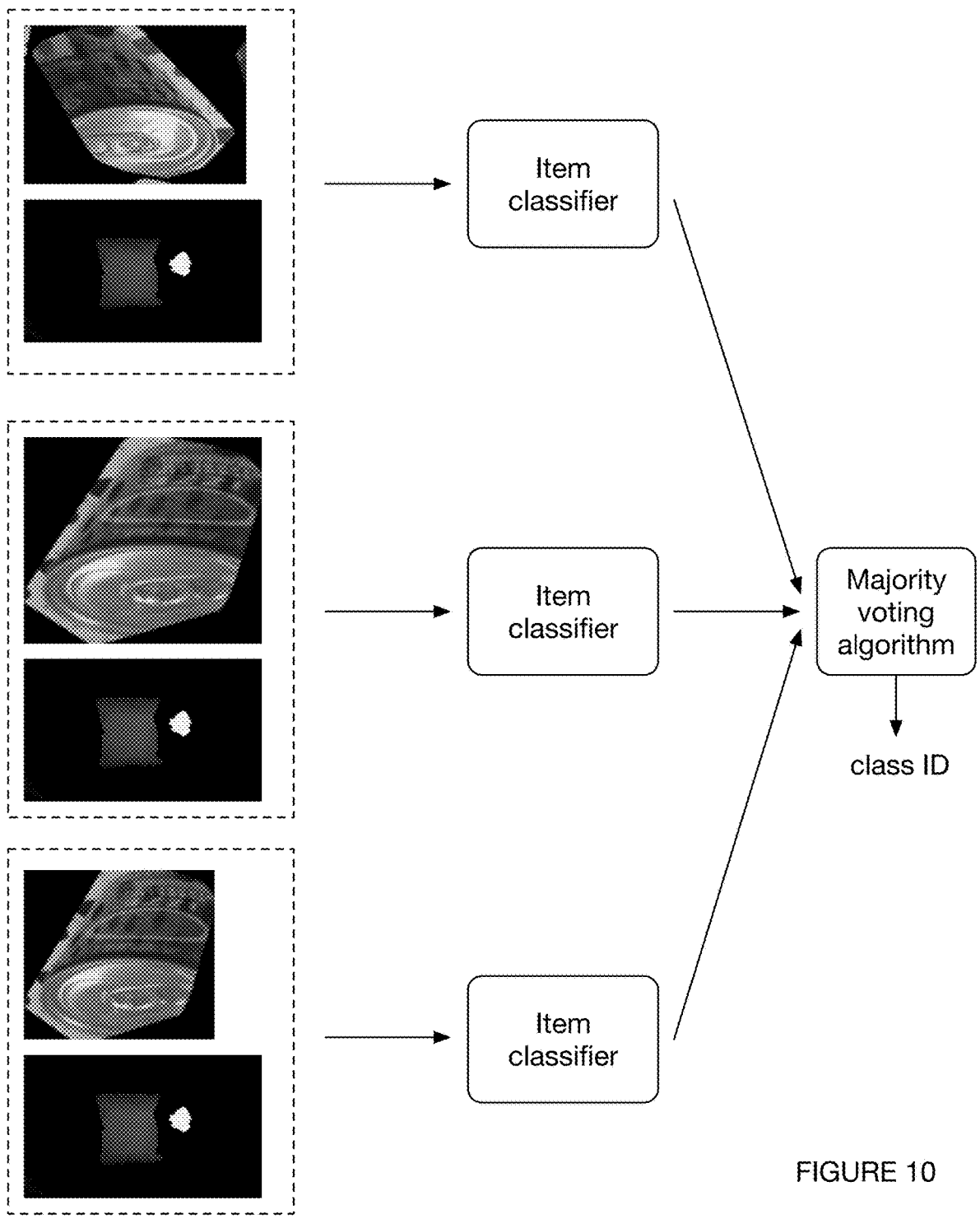
FIG. 10 depicts a variant of S700.

Determining the item identifier from the set of class candidates can include: voting on the item identifier (e.g., using a majority voting algorithm, wherein the most common class candidate within the set is selected as the item identifier, example shown in FIG. 10); selecting a highest-confidence class candidate as the item identifier; selecting the class candidate based on the respective probabilities (e.g., by adding the probability scores for each class-ID across all outputs in the set and choose the class-ID corresponding with the maximum value); or otherwise determining the item identifier.

In a second variation, S700 includes, for each (unknown) item: feeding the respective image segments (and optionally, geometric representation segment) into a classifier, wherein the classifier outputs the item identifier.

In a third variation, S700 includes, for each (unknown) item: determining an image feature vector for each image segment (e.g., using different instances of the same classifier); optionally determining a geometric feature vector for the respective geometric representation segment; and determining the item identifier based on the image feature vectors and, optionally, the geometric feature vector. Determining the item identifier can include: concatenating the image feature vectors and, optionally, the geometric feature vector to form a single input vector, and feeding the concatenated input vector a secondary classifier, wherein the secondary classifier outputs the item identifier. However, the item identifier can be otherwise determined based on the image feature vectors and/or the geometric feature vector.

In a fourth variation, determining a class identifier is performed using techniques described in U.S. application Ser. No. 17/079,056 filed 23 Oct. 2020, which is incorporated in its entirety by this reference.

However, the class identifier can be otherwise determined.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system comprising non-transitory computer readable medium having stored thereon software instructions that, when executed by a processing system, cause the processing system to perform a method by executing steps, comprising:

capturing a measurement set of an item within a measurement volume, wherein the measurement set comprises imagery and a 3D measurement of the item;

determining a height map for the item based on the 3D measurement;
determining a region mask for the item based on the height map;
constructing a surface reconstruction for the item based on the region mask and, the 3D measurement; and
extracting a visual segment for the item from the imagery using the surface reconstruction, wherein the item is identified using the visual segment.

2. The system of claim 1, further comprising:
a housing comprising a static base and defining the measurement volume; and
a camera statically mounted to the housing.

3. The system of claim 2, wherein the camera comprises a stereo camera pair.

4. The system of claim 1, wherein the steps further comprise: generating a point cloud from the measurement set, wherein the height map is generated using a top-down view of the point cloud.

5. The system of claim 1, wherein the imagery comprises an image set, wherein each image of the image set is captured by a different camera from a different point of view.

6. The system of claim 5, wherein each image of the image set is used to generate a different visual segment for the item, wherein the method further comprises:
extracting features from each visual segment; and
identifying the item based on the extracted features.

7. The system of claim 6, wherein the features extracted from different visual segments are used to determine candidate identifiers, and wherein the item is identified based on the candidate identifiers using a majority voting algorithm.

8. The system of claim 1, wherein identifying a region mask comprises detecting whether a different item is in contact with the item; and determining a different region mask for the different item when the item is in contact with the different item.

9. The system of claim 8, wherein the region mask and the different region mask are determined using a segmentation module.

10. The system of claim 9, wherein the segmentation module comprises a segmentation classifier.

11. The system of claim 1, wherein the item comprises a transparent item, wherein identifying the region mask for the transparent item comprises identifying a set of continuous pixels associated with values that are outside of a predetermined range.

12. The system of claim 11, wherein the values outside of the predetermined range comprise one of negative infinity, positive infinity, or no data.

13. The system of claim 1, wherein the surface reconstruction comprises an upper geometry defined by the height map and vertical walls defined by projecting a boundary of the region mask along a vertical axis.

14. A system, comprising:
a sensor configured to sample a measurement set of an item comprising imagery and a 3D information of the item; and
a processing system, configured to:
determine a height map for the item based on the 3D information;
determine a region mask for the item based on the height map;
construct a surface reconstruction for the item using the region mask and, the 3D information; and
extract a visual segment for the item from the imagery using the surface reconstruction, wherein the item is identified using the visual segment.

15. The system of claim 14, wherein the imagery comprises an RGB-Depth image.

16. The system of claim 15, wherein the sensor comprises a camera associated with a field of view that encompasses a calibration pattern, wherein the processor is further configured to determine a calibration matrix for the camera based on the calibration pattern.

17. The system of claim 14, wherein the visual segment is generated by projecting the surface reconstruction into the imagery.

18. The system of claim 14, wherein the region mask is generated by feeding the height map as input into a segmentation classifier and receiving the region mask as output from the segmentation classifier.

19. The system of claim 18, wherein the segmentation classifier is trained using a synthetic image, wherein the synthetic image comprises geometrically-combined item-specific geometric representation, wherein each item-specific geometric representation depicts a training item.

20. The system of claim 14, wherein the surface reconstruction is a coarse mesh.

21. The system of claim 14, wherein the surface reconstruction is generated by projecting the region mask downward along a z-axis of the height map.

* * * * *